United States Patent [19]

Steiner

[11] Patent Number: 5,042,193

[45] Date of Patent: Aug. 27, 1991

[54] STORAGE BOX FOR ICE FISHING TIP-UPS

[76] Inventor: Thomas J. Steiner, 7803 Highway 52, Wausau, Wis. 54401

[21] Appl. No.: 503,305

[22] Filed: Apr. 2, 1990

[51] Int. Cl.[5] .............................................. A01K 97.06
[52] U.S. Cl. .................................. 43/54.1; 206/315.11
[58] Field of Search ............................... 43/54.1, 57.1; 206/315.11; 224/920

[56] References Cited

U.S. PATENT DOCUMENTS

| | | | |
|---|---|---|---|
| 2,125,856 | 8/1938 | DeWitt | 43/57.1 |
| 2,539,302 | 1/1951 | Fye | 43/54.1 |
| 2,723,484 | 11/1955 | Nelson | 43/54.1 |
| 3,005,671 | 10/1961 | Majeski | 43/54.1 |
| 3,188,157 | 6/1965 | Rand | 43/54.1 |
| 3,330,608 | 7/1967 | Druger | 206/315.11 |
| 3,437,389 | 4/1969 | Perkins | 43/54.1 |
| 3,600,840 | 8/1971 | Meyer | 43/57.1 |
| 3,628,843 | 12/1971 | Wynne | 206/315.11 |
| 3,948,579 | 4/1976 | Schirmer | 43/57.1 |
| 4,006,553 | 2/1977 | Porter | 43/54.1 |
| 4,033,066 | 7/1977 | Morcom | 43/54.1 |
| 4,240,222 | 12/1980 | Covington | 43/57.1 |
| 4,271,624 | 6/1981 | Peluso | 43/54.1 |
| 4,756,412 | 7/1988 | Graves | 43/57.1 |
| 4,765,470 | 8/1988 | Curci | 206/315.11 |

Primary Examiner—Kurt Rowan
Attorney, Agent, or Firm—Andrus, Sceales, Starke & Sawall

[57] ABSTRACT

A storage box for ice fishing tip-ups and related fishing tackle and equipment is especially constructed to carry a plurality of tip-ups in separate storage compartments in a manner to prevent tangling of hooks and lines with those of adjacent stored tip-ups or on the stored tip-up itself. Other compartments provide convenient storage for all of the other tackle and equipment normally needed for ice fishing and the box includes drain holes to allow water accumulating from ice on the stored equipment to drain from the box. The drain holes are disposed in the bottom panel of the box as are similar attachment holes so that two identical boxes may be attached back-to-back. The drain and the attachment holes are all selectively openable as with molded-in knockouts, so they may be utilized only if desired or necessary. The carrying handle is demountable for relocation closer to the centerline of a attached box pair to facilitate carrying.

9 Claims, 2 Drawing Sheets

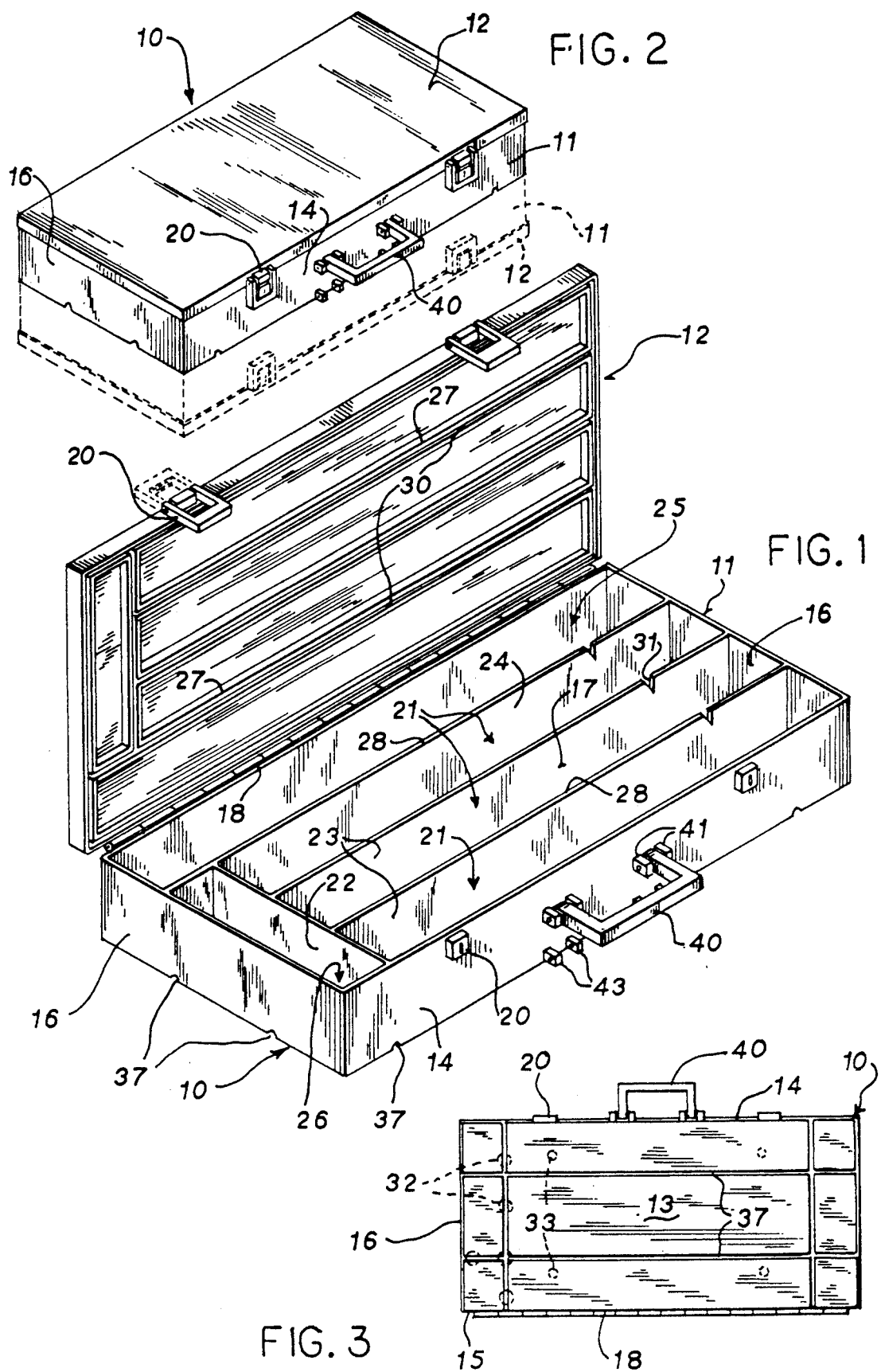

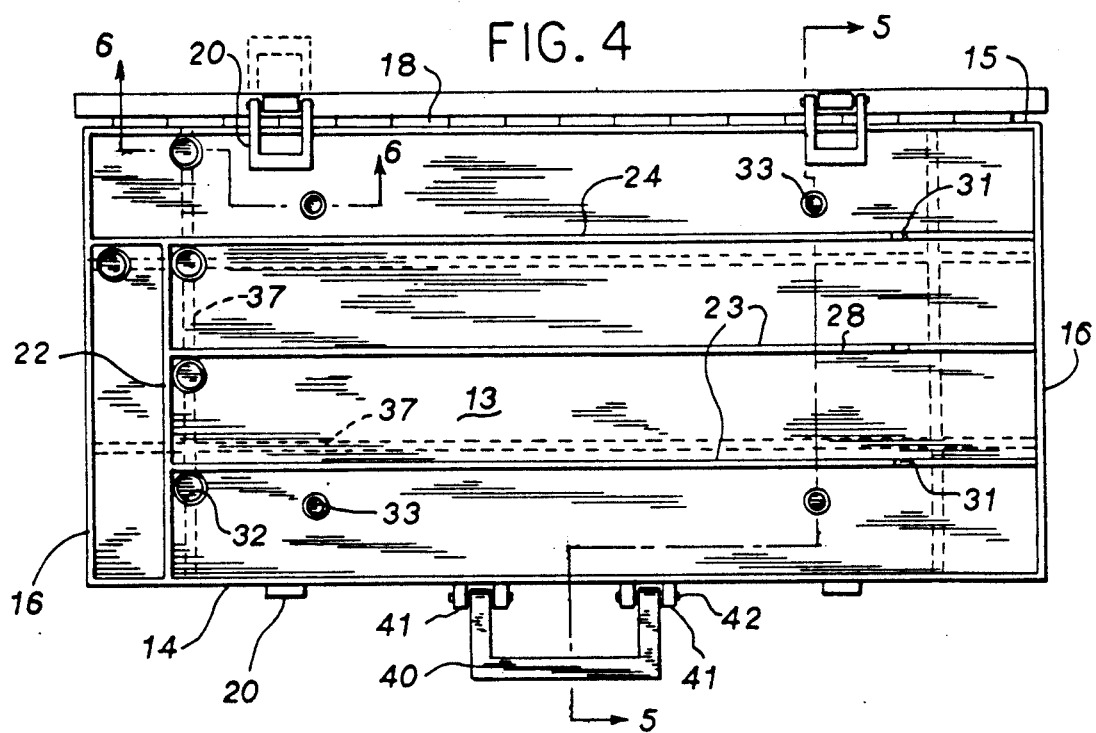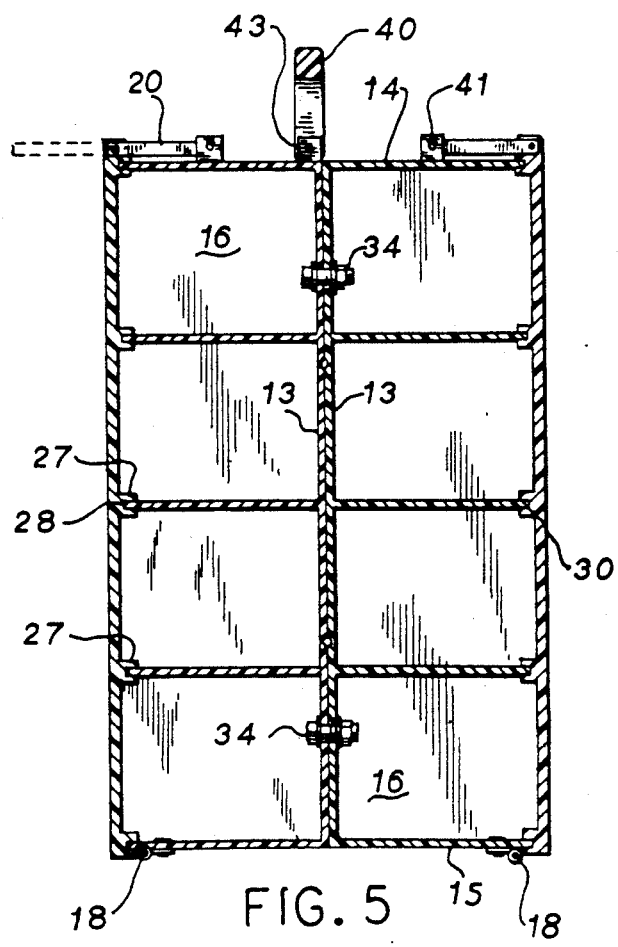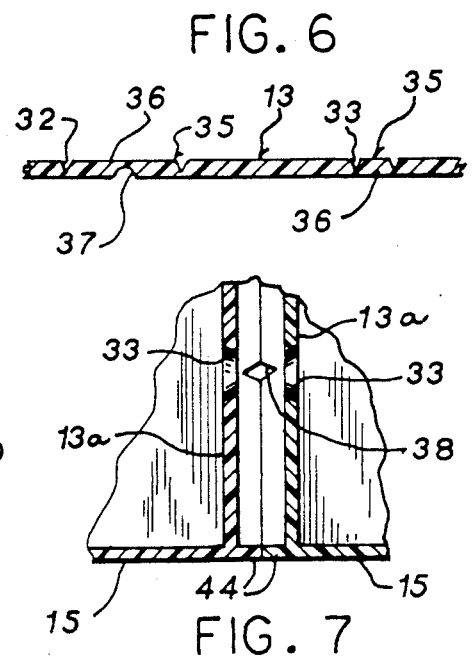

STORAGE BOX FOR ICE FISHING TIP-UPS

BACKGROUND OF THE INVENTION

The present invention relates to an ice fishing equipment storage box and, more particularly, to such a box especially adapted to individually store each of a number of collapsed or folded tip-ups and to also separately store most of the remaining tackle and equipment normally used for ice fishing.

As is well known in the sport of ice fishing, unique types of fishing tackle and equipment are utilized which are not normally used when fishing in open water. Included in this particularly specialized equipment are tip-ups, an ice scoop, and jig poles, the latter often used by a fisherman in lieu of a tip-up to actively work a single hole in the ice. Otherwise, the ice fisherman also utilizes the more or less conventional tackle, such as hooks, line, leaders, sinkers and baits, used in open water fishing as well. The equipment unique to ice fishing is notoriously cumbersome and somewhat difficult to store. In addition and unlike most open water fishing, ice fishing results in an accumulation of ice on the tip-ups, tackle and other equipment. As a result, the storage and transport of ice fishing tip-ups and related equipment has usually not been addressed in an organized manner and water which accumulates from melted ice often results in added inconvenience and problems. In addition, ice fishermen also often fish in the same location on a regular basis because, for example, the fisherman may operate from a more or less permanently stationed fishing shanty. In this case, the same or closely adjacent fishing holes in the ice may also be reused on a regular basis. In such situations, the fishermen will preferably fish at approximately the same depth and, if the lines on the tip-ups must be rewound or reeled up at the end of each fishing day, the fishermen will have to recheck and reset the depth when the tip-ups are next used even though the fishermen may again be fishing at the same depth. Also, winding the line and subsequently resetting the depth are tasks which fishermen would typically like to eliminate, if possible, because of the generally adverse conditions of cold weather in which ice fishing is usually done.

U.S. Pat. No. 3,348,329 shows a fishing tackle box particularly adapted to store disassembled fishing rods, and the reels and other tackle commonly used in open water fishing. One of the primary purposes of this fishing tackle box is to hold the fishing rod sections in a manner such that they are separated from one another and immobile during transport to prevent damaging shocks or the like. This is typically not a problem with ice fishing equipment and the prior art tackle box also does not address the other storage and environmental problems which are unique to ice fishing. U.S. Pat. Nos. 2,125,856; 2,242,059; and 2,763,957 all disclose storage boxes for small items of fishing tackle, such as hooks, hook and leader combinations, and lures and baits, each of which boxes includes separating compartments and a cover which engages the upper edges of the compartments when closed to completely segregate individual items of tackle stored therein. In this manner, leaders, hooks and the like are prevented from becoming tangled with those in other compartments.

There is a real need for a storage box which addresses the storage problems of ice fishing tip-ups and related equipment, is capable of conveniently storing all such equipment, addresses the special problems of ice and the like unique to ice fishing, and allows ice fishermen to store collapsed tip-ups without the necessity of winding the line and losing the depth setting. Such a storage box should also separately accommodate other types of equipment to avoid tangling with loose lines or the like and in a manner in which it is readily accessible when needed.

SUMMARY OF THE INVENTION

In accordance with the present invention, there is provided a storage box for ice fishing tip-ups and for all of the related fishing tackle and equipment normally needed by an ice fishermen which is stored in a convenient and organized manner and which overcomes the problems of loose line storage and melting of accumulated ice on stored equipment. The storage box comprises basically a generally rectangular box portion with a flat bottom panel, front and rear walls, opposite end walls, and a generally flat cover attached by a hinge to the box portion. The box portion includes a plurality of relatively narrow elongate first compartments which extend along a greater portion of the full length of the box, each of the first compartments sized to store a conventional tip-up in its collapsed or folded position. Each of the tip-up compartments has enclosing interior wall sections which extend substantially the full height of the box walls. The inside face of the cover is provided with sealing means to engage the upper edges of the walls and wall sections when the cover is closed to substantially seal the tip-up compartment from any adjacent compartment. The storage box also includes drain means in the bottom panel which communicates with each of the compartments for draining water accumulating from melting ice.

The sealing means between the cover and the upper edges of the wall sections preferably comprises grooved ridges formed integrally with the inside face of the cover which are coextensive with the upper edges of the wall sections and receive the edges therein when the cover is closed. The drainage means preferably comprises a plurality of selectively openable drain holes located in the bottom panel and positioned such that at least one drain hole is aligned directly with each of the compartments. The bottom panel of the storage box is also provided with symmetrically oriented attachment means which may be directly aligned with identical attachment means on the bottom panel of another storage box which is placed in back-to-back position for attaching the two boxes together. In its preferred embodiment, the attachment means comprises a plurality of selectively openable attachment holes each of which is directly alignable with an attachment hole on the bottom panel of an identical oppositely facing storage box. Each pair of alignable attachment holes on oppositely facing storage boxes disposed in back-to-back relation is adapted to receive a threaded fastener for ready attachment. Both the drain holes and attachment holes may comprises sections of reduced thickness in the bottom panel which are adapted to be individually punched out for selective opening.

The storage box may also be provided with drain channels in the underside of the bottom panel to provide open communication between the drain holes and the outer peripheral edge of the box when it is disposed with the panel against a substantially flat surface, including an identical storage box attached thereto. Each of the drain channels preferably comprises a groove in the bottom panel which directly interconnects a drain hole with at least one outer peripheral edge of the bottom panel.

In its preferred embodiment, the storage box also includes a second elongate compartment which has a length greater than the first compartments and is positioned parallel thereto and shares at least one common interior wall section therewith. The second compartment extends the full length of the box portion and is particularly adapted to store somewhat longer jig poles, an ice scoop or the like. The box also includes a third compartment positioned along the common ends of the first tip-up compartments and extending perpendicular to the lengths thereof. The third compartment is substantially smaller than the first and second compartments, shares a common interior wall section therewith and has a length equal to the combined widths of the first compartments. The third compartment may conveniently be used to hold small boxes, such as those described in the above identified prior art patents, which contain small items of fishing tackle.

The upper edges of the interior wall sections for each of the first compartments preferably include small notches which are sized to receive a fish hook, the notches being large enough so the hook receiving portion remains open when the cover on the box is closed. The notches are used to hold the hook on the end of a loose tip-up line and are preferably V-shaped.

The storage box preferably has a demountable handle centrally attached to the outer face of the box wall opposite the hinged attachment of the cover. The outside face of the handle mounting wall directly adjacent the bottom panel includes supplemental handling mounting means to which the handle may be alternately attached when the box is attached back-to-back to another identical storage box.

BRIEF DESCRIPTION OF THE DRAWINGS

FIG. 1 is a perspective view of the storage box of the present invention with the cover open to disclose details of the interior thereof.

FIG. 2 is a perspective view of two storage boxes attached in back-to-back relation.

FIG. 3 is a bottom plan view of the storage box.

FIG. 4 is a top plan view of the open storage box shown in FIG. 1.

FIG. 5 is a sectional view, taken on line 5—5 of FIG. 4, through two storage boxes attached in back-to-back relation.

FIG. 6 is an enlarged sectional view taken on line 6—6 of FIG. 5.

FIG. 7 is a partial sectional view through two storage boxes of a slightly modified construction.

FIG. 6 is an enlarged sectional view taken on line 6—6 of FIG. 1.

DETAILED DESCRIPTION OF THE PREFERRED EMBODIMENT

Referring initially to FIG. 1, a storage box 10 of the present invention includes a fairly shallow and generally rectangular lower box portion 11 and an upper generally flat cover 12. The box portion 11 includes a bottom panel 13 and integral upwardly extending front and rear walls 14 and 15, respectively, and opposite end walls 16. The box portion 11, including the interior wall section 17 (to be described hereinafter) and the cover are preferably made of plastic and may be manufactured by injection molding or any other suitable process. The upper edge of the rear wall 15 and the adjacent long edge of the cover 12 are connected with a hinge 18 which may comprise a continuous piano-type hinge or a number of smaller spaced hinges. The opposite front edge of the cover 12 and the adjacent outer faces of the front wall 14 are provided with a pair of latches 20 which may be of any convenient well known construction.

The interior of the box portion 11 is divided into a plurality of relatively narrow, elongate first compartments 21, each of which extends a greater portion of the full length of the box and is sized to hold a conventional tip-up in a collapsed or folded configuration. Tip-ups of more or less conventional construction, including the well known Polar and Beaver Dam types, are usually two feet or less in length when collapsed and, therefore, the first compartments 21 are similarly sized. The first compartments are, however, somewhat shorter than the overall length of the box 10 which may be about 26 inches. Each first compartment is defined at least in part by an enclosing interior wall section 17 which extends substantially the full height of the walls 14, 15, and 16 or, in other words, the full depth of the box portion 11. In the arrangement of the preferred embodiment, there are three first compartments extending in the direction of the length of the box and positioned in parallel relation from the front wall 14 toward the rear wall 15. The box may conveniently have a width (from front wall to rear wall) of about 12 inches or slightly more, and the corresponding widths of the first compartments 21 are preferably about three inches or slightly less. The depth of the box portion 11 and, therefore, the height of the walls and interior wall sections, are preferably about four inches. One common end wall of all three first compartments 21 comprises an end wall 16 and the opposite common end wall of the compartments comprises a short wall section 22. Each of the first compartments 21 shares one common intermediate wall section 23. The rearmost first compartment 21 also shares a long wall section 24 with a rear second compartment 25 extending the full length of the box. The second compartment 25 is particularly adapted to hold and store short jig poles and an ice scoop. Other long items may, of course, also be stored therein.

The remainder of the interior of the box is occupied by a small third compartment 26 positioned between one end wall 16 and the ends of the first compartments 21 and sharing the common short wall section 22 therewith. One narrow end of the third compartment 26 shares a portion of the long wall section 24 with the second compartment 25. Thus, the length of the third compartment 26 is equal to the combined widths of the three first compartments 21. The third compartment is particularly adapted to hold and store small boxes containing line, hooks, sinkers, lures or baits and the like.

It is an important feature of the storage box 10 of the present invention to provide sealing means between the cover and the upper edges of the wall sections 22, 23 and 24 which define the first compartments 21. The cover 12 is otherwise construction to sealingly engage the upper edges of the front and end walls 14 and 16, respectively, when closed. When tip-ups are stored without reeling or winding the line thereon, the line may simply be laid in a back and forth manner in the respective first compartment 21 along with the tip-up. However, as indicated, the upper edges of the interior wall sections must be sealed by the closed cover 12 to prevent loose line ends, hooks, etc. from crossing the partition walls and becoming entangled with tip-ups in adjacent compartments or with other equipment stored in the box. Referring particularly of FIGS. 1 and 5, the interior surface of the cover 12 includes a pattern of grooved ridges 27 arranged to be aligned and co-extensive with the upper edges 28 of each interior wall section 22, 23 and 24. The grooves 30 in the ridges 27 are just slightly wider than the thickness of the interior wall sections to receive and slightly overlap the upper edges 28 thereof. Other means for sealing the upper edges of the interior wall sections may also be utilized. Thus, in lieu of the grooved ridges 27, the interior surface of the cover 12 may be provided with a relatively soft compressible resilient layer, such as plastic foam, which will be deformed and seal the edges when the cover is closed. To additionally help prevent tangling of the loose tip-up line of a single tip-up within a first compartment 21, the upper edges 28 of one or more interior wall sections 22, 23 or 24 may be provided with one or more V-shaped notches 31. Before the cover 12 is closed on the box portion 11 to enclose the tip-ups therein, the fish hook at the end of the tip-up line is placed in a notch 31 and is held in place therein by the closed cover. The notches 31 are somewhat deeper than the depth of the grooves 30 in the ridges 27 so the hook will not interfere with closing of the cover, yet small enough to prevent the barbed end of the hook from passing therethrough when the cover is closed.

Referring also to FIGS. 2-4 and 6, the bottom panel 13 is constructed to accommodate the draining of water which may accumulate in the box from melting ice and to allow a storage box 10 to be conveniently attached in back-to-back relation with another like box 10. Thus, the bottom panel is provided with a plurality of selectively openable drain holes 32 and attachment holes 33. The holes 32 and 33 may conveniently be of the same size, shape and construction and may be used separately or together. Alternately, the drain holes 32 may be larger as shown. Indeed, if the attachment feature of the box of the present invention is not utilized, the attachment holes 33 may function as drain holes 32. Preferably, a drain hole 32 is disposed in communication with each interior compartment 21, 25 and 26. In this manner, a separate drain hole is preferably provided in the bottom of each compartment for direct drainage therefrom. However, it is also possible to use fewer drain holes and to provide interior communication therewith via holes in the lower edges of the interior wall sections 22, 23 or 24 to allow water to drain from one compartment to another and eventually out of a drain hole. The attachment holes 33, on the other hand, are disposed in an orientation which is symmetrical with respect to the bottom panel 13 so that when two storage boxes 10 are placed in back-to-back orientation for connection, pairs of attachment holes on adjacent boxes will be directly aligned. Four such attachment holes 33 are preferably provided in each bottom panel and the connections may be effected by any suitable threaded fastener, such as a bolt and nut 34 shown in FIG. 5. To provide the selective openability for the drain and attachment holes 32 and 33, respectively, each preferably comprises a panel section 35 of reduced thickness defining the hole which may be separated from the bottom panel by removal of a knockout or punchout plug 36.

To accommodate drainage of water from melted ice in the storage box when the box is lying on a flat surface the underside of the bottom panel 13 is provided with drain channels 37, as shown in FIGS. 3 and 4, which provide open communication between any selected drain hole 32 and the outer peripheral edge of the bottom panel. The drain channels 37 may be conveniently molded directly into the bottom panel 13 and the channels preferably comprise a drain groove 38 directly interconnecting each drain hole 32 with at least one outer edge of the bottom panel where the latter joins with a front wall 14, rear wall 45, or end wall 16.

In a slightly modified construction, shown in FIG. 7, the lower edges of the front, rear and end walls may be formed with a continuous peripheral lip 44 which surrounds the bottom panel 13a. When two boxes of this construction are placed back-to-back, contact will be made between the edges of the lips 44 with the panels 13a spaced from each other. To facilitate drainage of water exiting the box via a drain hole 32, the lip 44 may be provided with drainage notches 45 at convenient locations around the periphery of the box.

The outside face of the front wall 14 is provided with a demountable carrying handle 40. The handle 40 is of conventional U-shaped construction with its free ends disposed between pairs of pivot shoulders 41 integrally attached to the wall, and pivotally secured thereto by a pair of easily removable pivot pins 42. The lower edge of the front wall 14 immediately adjacent the bottom panel 13 is provided with supplemental pairs of second pivot shoulders 43 to which the handle 40 may be pinned with pivot pins 42 when the storage box 10 is attached back-to-back with another box. This restores balance to the attached box combination to facilitate carrying.

Various modes of carrying out the invention are contemplated as being within the scope of the following claims particularly pointing out and distinctly claiming the subject matter which is regarded as the invention.

I claim:

1. A storage box for ice fishing tip-ups and related fishing tackle and equipment comprising:
    a generally rectangular box portion having a bottom panel, front and rear walls, and opposite end walls;
    a generally flat cover hingedly attached to said box portion;
    a plurality of relatively narrow, elongate first compartments extending a greater portion of the full length of said box portion, each of said compartments adapted to store a collapsed tip-up;
    each of each first compartments having compartment-enclosing interior wall sections extending substantially the full height of said front, rear and end walls;
    sealing means on the inside face of said cover for engaging the upper edges of said walls and wall sections when said cover is closed to substantially seal said compartments along said upper edges; and,
    drain means in said bottom panel in communication with each of said compartments for draining accumulated water from said compartments, said drain means comprising a plurality of selectively openable drain holes in said bottom panel, one of said drain holes aligned with each of said compartments.

2. The storage box as set forth in claim 1 further comprising symmetrically oriented attachment means on said bottom panel, said attachment means alignable with identical attachment means on the bottom panel of an oppositely facing storage box for back-to-back attachment of said storage boxes.

3. The storage box as set forth in claim 2 wherein said attachment means comprises a plurality of selectively openable attachment holes in said bottom panel, each alignable with an attachment hole on said oppositely facing storage box.

4. The storage box as set forth in claim 3 wherein attachment means further comprises a threaded fastener for each pair of alignable attachment holes.

5. The storage box as set forth in claim 3 wherein said selectively openable drain holes and attachment holes comprise panel sections of reduced thickness defining said respective drain and attachment holes and adapted to be individually punched-out.

6. The storage box as set forth in claim 1 further comprising drain channels in said bottom panel, said channels providing open communication between said drain holes and the outer peripheral edge of said bottom panel when said panel is disposed against a substantially flat surface.

7. The storage box as set forth in claim 6 wherein said drain channels each comprises a groove in said bottom panel interconnecting a drain hole with at least one edge of said bottom panel.

8. The storage box as set forth in claim 4 including a demountable handle centrally mounted on the outside face of the wall opposite the hinged attachment, and supplemental handle mounting means on said outside face directly adjacent the intersection of the wall with the bottom panel for demountable attachment of said handle when said box is attached back-to-back to said oppositely facing box.

9. A storage box for ice fishing tip-ups and related fishing tackle and equipment comprising:
- a generally rectangular box portion having a bottom panel, front and rear walls, and opposite end walls;
- a generally flat cover hingedly attached to said box portion;
- a plurality of relatively narrow, elongate first compartments extending a greater portion of the full length of said box portion, each of said first compartments adapted to store a collapsed tip-up;
- each of each first compartments having compartment-enclosing interior wall sections extending substantially the full height of said front, rear and end walls;
- said bottom panel comprising a common bottom wall for said first compartments;
- sealing means on the inside face of said cover for engaging the upper edges of said walls and wall sections when said cover is closed to substantially seal said first compartments along said upper edges; and,
- drain means in said bottom panel in communication with each of said first compartments for draining accumulated water from said first compartments;
- a second compartment having a length greater than said first compartment, positioned parallel thereto and sharing a common interior wall section, said second compartment extending the full length of said box portion;
- a third compartment positioned along the ends of said first compartments, said third compartment extending perpendicular to the length of said first and second compartments, sharing a common interior wall section therewith, and having a length equal to the combined width of said first compartments; and,
- said second and third compartments sharing said common bottom wall and said drain means communicating with each of said second and third compartments.

* * * * *